United States Patent [19]

Gill et al.

[11] 4,434,614

[45] Mar. 6, 1984

[54] COMBUSTION CHAMBER IN A ROCKET PROPULSION SYSTEM WITH MULTIPLE DIVERGENT PORTION

[76] Inventors: George Gill, 4662 Green Canyon Dr., Las Vegas, Nev. 89103; Alain Souchier, Le Chenet de Blaru, Bonnieres S/Seine, France, 78270; Georges Dorville, Mézieres en Vexin, Tourny, France, 27510

[21] Appl. No.: 366,985

[22] Filed: Apr. 9, 1982

[30] Foreign Application Priority Data

Apr. 13, 1981 [FR] France ................................ 81 07366

[51] Int. Cl.³ .............................................. F02K 1/08
[52] U.S. Cl. ................................. 60/271; 239/265.15; 239/265.19; 102/378
[58] Field of Search ................................ 60/271, 242; 239/265.11, 265.15, 265.19; 102/377, 378

[56] References Cited

U.S. PATENT DOCUMENTS

| | | | |
|---|---|---|---|
| 3,011,309 | 12/1961 | Carter | 60/242 X |
| 3,079,752 | 3/1963 | Thielman | 239/265.15 |
| 3,237,402 | 3/1966 | Steverding | 239/265.15 X |
| 3,250,070 | 5/1966 | Milewski et al. | 60/271 |
| 3,855,789 | 12/1974 | Platzek | 239/265.19 X |
| 4,022,129 | 5/1977 | Day et al. | 239/265.19 X |

FOREIGN PATENT DOCUMENTS 705847  3/1954  France ................................. 60/271

*Primary Examiner*—Carlton R. Croyle
*Assistant Examiner*—Donald E. Stout
*Attorney, Agent, or Firm*—Louis E. Marn; Elliot M. Olstein

[57] ABSTRACT

The present invention relates to a combustion chamber in a rocket propulsion system comprising a combustion enclosure and a nozzle for ejection of the gases produced in the combustion enclosure, the divergent portion of the nozzle comprises an outer divergent portion connected to the throat of the nozzle and at least one inner divergent portion of which the exit section is smaller than that of the outer divergent portion and which is fitted in the outer divergent portion and connected thereto by connecting means associated with means for selectively destroying said connecting means to allow automatic separation and ejection of the inner divergent portion at a predetermined instant of functioning of the combustion chamber corresponding to a predetermined altitude of the rocket propulsion system.

14 Claims, 6 Drawing Figures

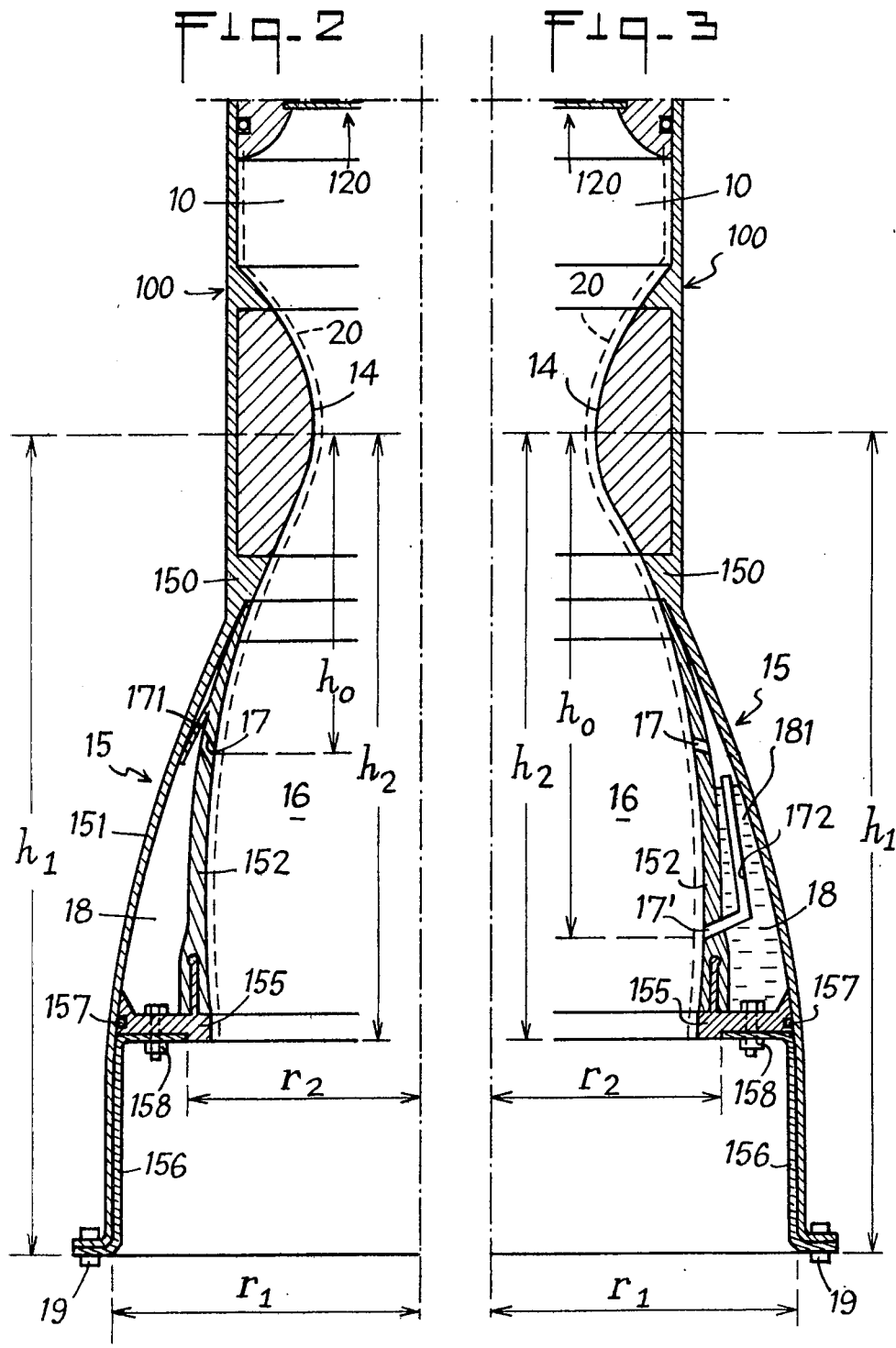

COMBUSTION CHAMBER IN A ROCKET PROPULSION SYSTEM WITH MULTIPLE DIVERGENT PORTION

The present invention relates to combustion chambers in rocket propulsion systems of the type comprising a combustion enclosure into which are introduced propellants and a nozzle for ejection of the gases produced in the combustion enclosure.

Combustion chambers of this type are already known, for which the geometry of the divergent portion which extends the throat of the nozzle is variable in order to adapt the divergent portion to the variable ambient conditions of the flight. In fact, it is known that optimal adaptation is obtained when the exit pressure of the divergent portion is equal to the ambient pressure. For a missile launched from the ground, the ambient pressure which corresponds at departure to 1 bar of atmospheric pressure constantly decreases as the missile gains height. To conserve an adaptation of the exit pressure of the divergent portion to ambient pressure, the exit section of the divergent portion should be increased when the ambient pressure decreases.

This modification in the geometry of the divergent portion of a nozzle of a rocket propulsion system has been effected, in known embodiments, due to the use of extendible divergent portions composed of articulated panels. During flight, the fact of extending all the panels creates a frustum of cone whose length and exit section are greater than those of the initial frustum of cone. However, such a system presents numerous drawbacks. In particular, it is difficult to produce hinges between articulated panels which are capable of resisting the attack of the hot gases from the nozzle. The control of extension is itself relatively complex and the variations in geometry of the divergent portion are limited. It is particularly difficult actually to modify the exit angle of the divergent portion. Finally, the known systems for varying the geometry of nozzles are not well adapted to very high power combustion chambers such as those used in first stages of rockets intended to be propelled from the ground to an altitude of the order of 40 kilometers where a virtual vacuum prevails.

Combustion chambers of rocket propulsion systems are also known, in which a plurality of concentric divergent portions of different sections are fitted in one another and associated with the same nozzle throat thus forming a multiple divergent portion. The or each inner divergent portion disposed inside the outer divergent portion is connected to the throat of the nozzle for ejecting the gases of the combustion chamber and they are successively disconnected, starting with the divergent portion of smallest exit section, at predetermined instants, in order to increase the exit section of the divergent portion and thus adapt the value of the gas exit pressure at the exit of the divergent portion of the nozzle, to the value of the outside atmospheric pressure. However, the fact that the different divergent portions are connected to one another, for example by adhesion, at nozzle throat level, renders disconnection thereof delicate, and ejection of the inner divergent portion is often problematic since the pressure stresses exerted on this inner divergent portion tend to push it towards the throat, and therefore to maintain it in place.

It is an object of the present invention to overcome the above-mentioned drawbacks and to produce a combustion chamber for rocket propulsion system which is equipped with a divergent portion easily adaptable to the variations in ambient pressure, even when such variations are considerable.

These aims are achieved with a combustion chamber in a rocket propulsion system with multiple divergent portion, comprising a combustion enclosure in which propellants are introduced and a nozzle for ejection of the gases produced in the combustion enclosure, the divergent part of the nozzle comprising an outer divergent portion connected to the neck of the nozzle and at least one inner divergent portion whose exit section is smaller than that of the outer divergent portion and which is fitted in the outer divergent portion and connected thereto by connecting means associated with means for selectively destroying said connecting means to allow separation and ejection of the inner divergent portion at a predetermined instant of the functioning of the combustion chamber corresponding to a predetermined altitude of the rocket propulsion system, wherein the inner divergent portion is retained in position inside the outer divergent portion by said connecting means which themselves are fixed to the lower part of the inner divergent portion, on the one hand, and to the lower part of the outer divergent portion on the other hand, whilst the upper part of the inner divergent portion is fitted laterally against the upper part of the outer divergent portion, at the exit of the nozzle throat, and in that pressure balancing ports are arranged in the inner divergent portion so as to produce a counter-pressure on the outer face of the inner divergent portion.

This configuration greatly facilitates ejection of the inner divergent portion.

In fact, in this case, the means for selectively destroying the connecting means connecting the inner divergent portion to the outer divergent portion are advantageously constituted by simple pyrotechnic charges acting on the base of the outer divergent portion. As soon as the disconnection is effected between an outer divergent portion and an inner divergent portion, the latter is automatically ejected.

According to a feature of the invention, the space between the inner divergent portion and the outer divergent portion is obturated by a ring connected to the lower part of the inner divergent portion.

According to a particular embodiment, the pressure balancing ports are placed so as to create a pressure of about 3 bars in the space between the inner divergent portion and the outer divergent portion.

Deflectors are mounted on the inner divergent portion in the vicinity of the pressure balancing ports in order to limit the projections of jets of gas against the outer divergent portion.

In this case, the space between the inner and outer divergent portions is filled with a cooling fluid.

To limit the risks of buckling of the inner divergent portion, binding washers may be associated therewith.

The invention is more particularly applied to combustion chambers of the type comprising means for cooling the walls of the chamber constituted by a liquid film circulating downwardly along the inner walls of the combustion enclosure and of the nozzle, and therefore of the divergent portion of the latter. In this case, the use of multiple divergent portions according to the invention does not require particular adaptation of the cooling system to the different forms of the divergent portion defined by the inner divergent portion or the outer divergent portion.

The upper part of an inner divergent portion may be fitted on the upper part of the outer divergent portion in several different ways.

Thus, in a first embodiment, in the zone of connection of the inner divergent portion and the outer divergent portion at the exit of the nozzle throat, the outer divergent portion presents in its upper part supporting the nozzle throat a shoulder forming an abrupt, limited shoulder of the section of the outer divergent portion and the upper end of the inner divergent portion forming leading edge is fitted beneath said shoulder.

According to another possible embodiment, in the zone of connection of the inner divergent portion and the outer divergent portion at the exit of the nozzle throat, the outer divergent portion presents no discontinuity, whilst the upper end of the inner divergent portion forming leading edge abuts against the wall of the outer divergent portion, forming an abrupt, limited narrowing of the section of the divergent portion constituted by the upper part of the outer divergent portion forming support of the nozzle throat and the inner divergent portion.

The invention will be more readily understood on reading the following description with reference to the accompanying drawings, in which:

FIGS. 2 and 3 are views in axial half-section of two particular embodiments of a combustion chamber with double divergent portion.

Figure 1:
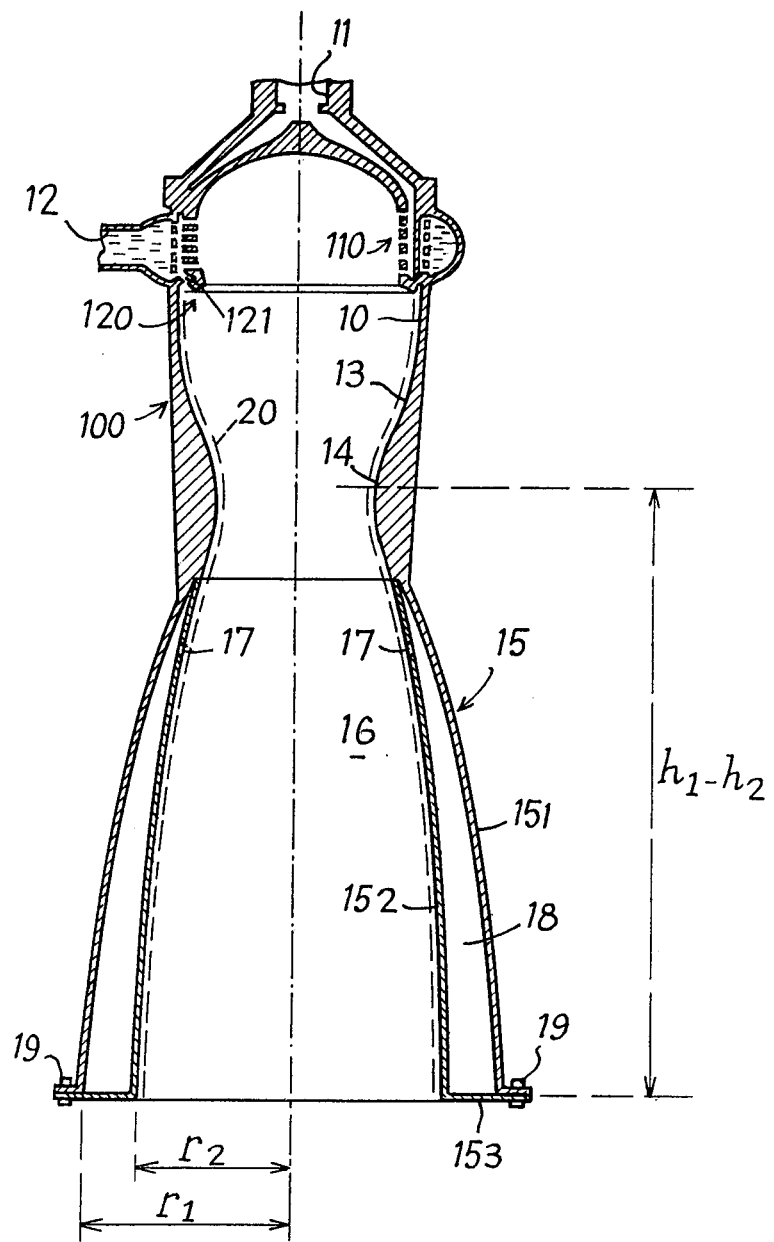
FIG. 1 is a general schematic view in axial section of a combustion chamber according to the invention.

Referring now to the drawings, FIG. 1 shows a simplified view of a rocket propulsion system engine 100, which may for example be of the Viking type and comprises a combustion enclosure 10 in which are introduced, via injectors 110, 120 respectively propellants conducted through supply conduits 11, 12. The propellants may include non-cryogenic oxydant and fuel, such as nitrogen peroxide and UDMH for example. The combustion produced in the enclosure 10 creates exhaust gases which are evacuated through the nozzle 14. The profile of the convergent portion 13 and especially of the divergent part 15 located on either side of the nozzle throat 14 determine the evolution of the pressure of the combustion gases inside the nozzle and the thrust surface which determines the performances of the engine. Cooling of the combustion chamber of the engine 100 constituted by the actual enclosure 10 and the nozzle 14 with its divergent portion 15, is effected due to the circulation of a thin film of liquid 20 along the inner walls of the combustion chamber. This film of liquid 20 may be constituted simply by a fraction of the combustible liquid introduced by additional injectors 121 oriented towards the wall of the enclosure 10 and not towards the focus of the enclosure 10. The cooling system is particularly simple in this case since it is not necessary to embed cooling tubes in the combustion chamber or to make other arrangements capable of rendering the construction of the engine more complicated and less easily adaptable.

As may be seen in FIG. 1, the divergent portion 15 is, however, not made in one piece, as in conventional embodiments, but, on the contrary, comprises, in addition to an outer divergent portion 151 which may be connected to the nozzle throat 14 in conventional manner, an additional inner divergent portion 152 of geometry different from that of the outer divergent portion 151 and of more reduced exit section, defined by a radius r2 smaller than the radius r1 of the exit section of the outer divergent portion 151. The inner divergent portion 152 is connected by a ring 153 fast with its lower part, to the lower part of the outer divergent portion 151. However, disconnecting means such as explosive bolts 19 make it possible to disconnect the inner divergent portion 152 from the outer divergent portion 151 at a predetermined instant and to provoke ejection of the inner divergent portion 152 insofar as pressure balancing ports 17 made in the inner divergent portion 152 enable a counter-pressure to be exerted in the space 18 between divergent portions on the outer surface of the inner divergent portion 152.

The use of a plurality of divergent portions such as 152, 151 of increasing exit sections, fitted in one another and provided with means allowing successive ejection of the different inner divergent portions at predetermined instants, starting with the inner divergent portion with the smallest exit section, makes it possible to make an effective and easy modification of the geometry of the useful divergent portion defining the evolution of the pressure in the nozzle downstream of the throat, to adapt the divergent portion to the ambient conditions of the flight which are themselves variable when the self-propelled missile takes altitude. By successively using useful divergent portions of increasing exit section, it is possible to remain constantly very close to the optimal adaptation for which the exit pressure of the divergent portion is equal to the ambient pressure.

In the case of a double divergent portion 15 constituted by an outer divergent portion 151 and one inner divergent portion 152, as is the case in the embodiments shown in the drawings (cf. in particular FIGS. 2 and 3), the various parameters constituted by the useful length $h_1$, $h_2$ from the throat of the nozzle 14, the radius r1, r2 of the exit section and the exit angle with respect to the axis, of each of the outer and inner divergent portions 151 and 152 respectively, may be optimized to effect maximum adaptation to the ambient conditions at each of the phases of flight determined firstly by a configuration in which the useful divergent portion is constituted by the inner divergent portion 152 of small exit section, for a flight at low altitude, then by a configuration in which the useful divergent portion is constituted by the outer divergent portion 151 of large exit section, for a flight at high altitude, after ejection of the small inner divergent portion 152. The instant of ejection of the inner divergent portion 152 which determines the passage from one flight phase to the other is naturally predetermined to correspond to a given altitude taking into account the chosen law of evolution of the altitude as a function of time.

The length of the inner divergent portion 152 may be determined so that the useful height $h_2$ between the nozzle throat 14 and the exit section of the inner divergent portion 152 is clearly less than the useful height $h_1$, between the nozzle throat 14 and the exit section of the outer divergent portion 151 (FIGS. 2 and 3). However, according to another embodiment (FIG. 1), the useful lengths $h_2$ and $h_1$ of the inner and outer divergent portions 152 and 151 respectively may be identical so that the exit sections of the two divergent portions 151 and 152 are in the same place.

The arrangement of a small ejectable inner divergent portion 152 inside a large fixed outer divergent portion 151 will be more particularly described with reference to FIGS. 2 to 6, in which the elements similar to those of FIG. 1 bear the same numerical references.

The inner divergent portion 152 shown in FIGS. 2 and 3 is retained at the bottom by means of the connecting pieces 155 and 156, assembled by bolts 158. The ring-shaped piece 155 is anchored in the wall of the inner divergent portion 152 and extends radially up to the inner wall of the outer divergent portion 151 to obturate the space 18 between divergent portions. A seal may be interposed in the housing 157 to ensure tightness between the ring 155 and the wall of the outer divergent portion 151. One or more connecting pieces 156, which may for example present a Z-shaped section, are fixed on the one hand to the ring 155 by the bolts 158 and on the other hand to the base of the outer divergent portion 151 by explosive bolts 19, i.e. assembly means associated with pyrotechnic charges capable of provoking total disconnection of the pieces 156 with respect to the outer divergent portion 151 when said charges are fired.

The small inner divergent portion 152 which is retained at the bottom as indicated hereinabove, is, in its upper part, simply fitted laterally in the large fixed divergent portion 151. In the absence of outer counter-pressure exerted on the small divergent portion, the distribution of the inner pressures in space 16 inside said divergent portion 152 pushes the latter upwardly. In order to allow easy ejection of the inner divergent portion 152 upon disconnection of the explosive bolts 19, a pressure is introduced into the space 18 between the outer divergent portion 151, the inner divergent portion 152 and the ring 155 fast with the inner divergent portion 152. The counter-pressure introduced into the space 18 between divergent portions through pressure balancing ports 17 from the space 16 inside the small divergent portion 152, is exerted both on the outer face of the inner divergent portion 152 and on the upper face of the ring 155. The counter-pressure introduced in the space 18 between divergent portions is taken by ports 17 to a level $h_0$ of the wall of the small divergent portion, with respect to the nozzle throat 14, where the value of the pressure, which decreases downwardly in the space 16, remains sufficient for the resultant of the efforts applied to the assembly composed of the inner divergent portion 152 and the ring 155 to be directed downwardly. Upon breakage of the explosive bolts 19 which retain the connecting pieces 156, 155 of the small divergent portion 152, the latter is ejected in reliable manner. The communication holes 17 which introduce the pressure in the volume 18 between divergent portions may be sufficiently large for leakages in the lower part of the space 18 between divergent portions or admissions of gas through the slots made between the upper part of the inner divergent portion 152, or leading edge and the wall of the outer divergent portion 151, to be negligible. Deterioration of the seals placed in the housings 157 at the base of the space 18 between the ring 155 and the wall of the outer divergent portion 151, and of the seals 21 (FIGS. 4 to 6) placed between the upper parts of the inner and outer divergent portions 152 and 151, can therefore not affect correct functioning of the system.

By way of simple illustration, according to a particular embodiment, the thrust due to the distribution of the pressures of the jet on the small divergent portion has been found at $2.15 \, 10^5$ N (21.5 T) (including the thrust of the atmospheric pressure on the connecting ring 155 between divergent portions).

With 3 absolute bars of pressure between divergent portions in space 18 which may be determined by placing the ports 17 communicating the volume 18 between divergent portions with the jet 16, at a distance $h_0$ from the plane of the nozzle throat 14 (minimum section), the effort exerted on the bottom is $3.74 \, 10^5$ N, this leaving $1.59 \, 10^5$ N (15.9 T) for the effort of extraction, which guarantees an automatic ejection of the inner divergent portion 152 after rupture of the bolts 19.

As may be seen in FIG. 2, deflectors 171 attached to the inner divergent portion 152 above the ports 17 may be disposed so as to constitute screens in front of the communication holes 17 and to avoid too forceful a projection of jets of gas on the wall of the outer divergent portion 151.

Concerning the cooling of the divergent portions 151, 152, no adaptation of the general cooling system by film of liquid 20 is necessary to take into account the variations in geometry of the useful divergent portion. In fact, during the first phase of operation in the course of which it is the inner divergent portion 152 which is the useful divergent portion and determines the thrust by the action of the gases from space 16 which exert efforts of pressure on the inner wall of the inner divergent portion 152, the thin film of liquid 20 present along the walls of the enclosure 10 and the throat of the nozzle 14 extends along the inner wall of the inner divergent portion 152. Similarly, during the second phase of operation, after ejection of the small inner divergent portion 152, the film of liquid 20 may circulate in conventional manner along the inner wall of the outer divergent portion 151 which remains alone and becomes the useful divergent portion subjected to the direct pressure of the combustion gases.

To take into account the fact that the small inner divergent portion 152 located inside the large fixed divergent portion 151 is relatively poorly cooled by radiation towards the outside, additional cooling means may be used. In this way, in the embodiment of FIG. 3, the space 18 between the two divergent portions 151 and 152 is filled with a cooling fluid 181, which may for example simply be water. The vapour created emerges through the pressure balancing ports 17. An additional protection is thus provided for the inner divergent portion 152 by film of liquid. In the case of this embodiment, the role of cooling of the fluid 181 may be improved if exchanges by convection are accentuated due to a circulation of the nozzle gases in the fluid 181. This may be effected due to the presence of additional holes 17' made in the wall of the inner divergent portion 152 at a relatively low level $h_0$ with respect to the nozzle throat 14, i.e. in the lower part of the space 18 between divergent portions. In order to avoid evacuation of the cooling fluid, these communication holes 17' may be connected by tubes 172 to the pocket of vapour located in the upper part of the space 18 between divergent portions.

The inner divergent portion 152 may be made of a refractory metallic material if its functioning time is not to be too long. The inner divergent portion 152 is preferably made of a non-metallic ablative composite material having good mechanical strength, such as for example a silica or carbon fabric impregnated with phenolic resin or a carbon fabric impregnated with carbon. The inner divergent portion must, moreover, remain relatively thick so as to produce a resistance to the buckling stresses introduced at the base of the divergent portion by the fact that the outer pressure of the space 18 necessary for ejection is greater than the inner pressure of space 16. It will be noted that the inner divergent portion 152 may also be provided with binding washers opposing buckling thereof. The outer divergent portion 151 may advantageously be made of a refractory metallic material.

The connection at the top, at the exit of the throat of the nozzle 14, between the small divergent portion 152 and the large divergent portion 151, is effected as has already been indicated, without positive connection, by the inner divergent portion 152 simply fitting inside the outer divergent portion 151. Three possible variant embodiments of the configuration of the top connection of the inner and outer divergent portions 152 and 151 respectively are shown in FIGS. 4 to 6.

Figure 4:
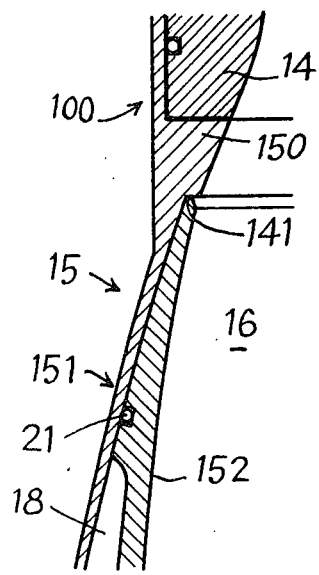
FIGS. 4 to 6 show detailed views in axial section illustrating the connection of the upper parts of an inner divergent portion and of an outer divergent portion of a combustion chamber with double divergent portion.
Figure 5:
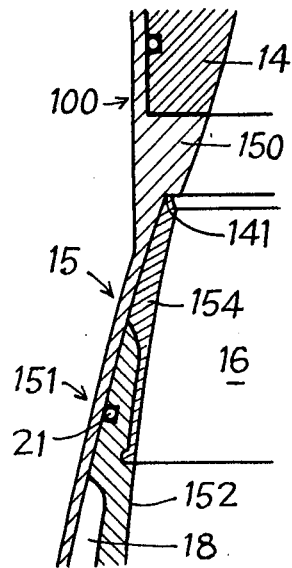

FIGS. 4 and 5 show the top part 150 of the outer divergent portion 151, which forms a ring for supporting the throat of the nozzle 14, itself capable of being made of a material different from that of the outer divergent portion 151. This top part 150 presents a shoulder 141 which forms an abrupt widening, but of limited dimensions, of the outer divergent portion 151. Such a limited widening does not substantially affect the functioning of the fixed outer divergent portion 151 after ejection of the inner divergent portion 152 and enables the top part forming leading edge of the inner divergent portion to fit beneath the shoulder 141, so that there is only a very limited discontinuity between the top part 150 of the outer divergent portion 151 and the leading edge of the inner divergent portion 152, despite the thickness which this leading edge must present to resist the flow of hot gases from the nozzle.

FIG. 4 shows an inner divergent portion 152 made of a single non-metallic material such as for example a silica or carbon fabric impregnated with a resin, whilst FIG. 5 shows an inner divergent portion 152 whose largest part is also made of a non-metallic material of the above-mentioned type, but which further comprises a leading edge constituted by an insert 154 made of a different material such as a refractory metallic material. In this latter case, to take into account the different coefficients of expansion of the materials constituting, on the one hand, the major part of the inner divergent portion 152 and, on the other hand, the leading edge insert 154, a very progressive evolution of thickness should be provided for the leading edge.

Figure 6:
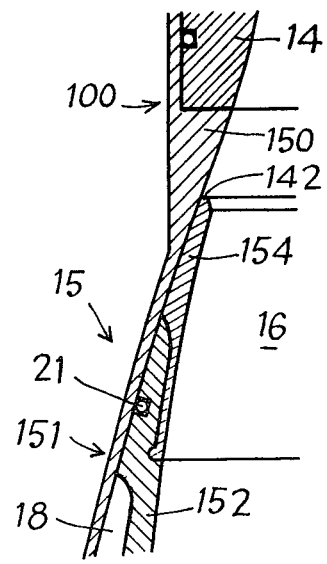

FIG. 6 shows another embodiment of the connection of the top parts of the inner and outer divergent portions 152 and 151. In this case, the outer divergent portion 151 comprises no discontinuity, shoulder or projection capable of affecting the progressive evolution of the section of this divergent portion and allows optimum functioning of the combustion chamber 100 during the second phase of the flight after ejection of the inner divergent portion 152. In the case of this embodiment, the inner divergent portion 152, which may or may not comprise a leading edge insert 154 made of a material different from that of the body of the inner divergent portion, forms a slight projection 142 for the flow of the gases coming from the throat of the nozzle 14 and directed towards the space 16 during the first phase of the flight for which the inner divergent portion 152 constitutes the active divergent portion.

The choice of the variants of FIGS. 4, 5 or 6 may depend in particular on the relative importance given to the two flight phases.

Generally, the configuration of the combustion chambers according to the invention, in addition to improved performance in transfer orbit due to the better adaptation to the variations in the ambient conditions, leads to a reduction in the thermal stresses to which each of the divergent portions 151, 152 is subjected, since the duration of active functioning is reduced by comparison with the systems with single, even extendible divergent portion.

Furthermore, it is particularly simple to produce the ejection system and the various interfitting divergent portions which are used in turn do not require particular adaptation. Thus, each of the elementary divergent portions 151, 152 of the multiple divergent portion 15 may simply be constituted by a divergent portion whose profile was designed as for a combustion chamber with single divergent portion. The mode of modular functioning according to which successive substitutions are made of a series of elementary divergent portions which are fitted in one another and coaxial, makes it possible, in fact, at each stage, to conserve, with the active divergent portion in use, which is the innermost divergent portion, an operational mode defined solely by the profile of this active divergent portion considered as if it were alone. Adjustments are thus largely facilitated with respect to systems in which a progressive variation, and not a variation in steps, of the geometry of a divergent portion, would be envisaged.

By way of example, it will be noted that, for the same mission, the improved performance made by using a double divergent portion in place of a single divergent portion with optimised profile, corresponds to several tens of kg of payload in transfer orbit. This gain of several tens of kg is equivalent to what would be obtained by an increase of the order of several bars for the focal pressure of the combustion chamber. In addition, the use of multiple divergent portions ensuring several distinct operational phases also allows smoother ignition.

The preceding description has been made more particularly with reference to embodiments using double divergent portions. The design would naturally remain similar with triple divergent portions, for example. In this latter case, the difference would essentially consist in the use of connecting means particular to each of the inner divergent portions and connecting them individually either to the immediately adjacent divergent portion of greater section, or directly to the outermost fixed divergent portion, so that the connecting means particular to each inner divergent portion may be broken individually in a determined sequence including two successive breaks respectively of the connecting means of a first inner divergent portion, then of a second inner divergent portion, followed each time by ejection of the corresponding inner divergent portion, to define three operational phases in the case of a triple divergent portion. The process would be the same for n successive breaks followed by n ejections to define n+1 operational phases in the case of a multiple divergent portion with n elementary divergent portions. In any case, the connecting means are engaged on the lower part of the elementary divergent portions, the top parts of the elementary divergent portions remaining fixed against one another.

What is claimed is:

1. In a combustion chamber in a rocket propulsion system with multiple divergent portions, comprising a combustion enclosure in which propellants are introduced and a nozzle for ejection of the gases produced in the combustion enclosure, the divergent part of the nozzle and at least one inner divergent portion whose exit section is smaller than that of the outer divergent portion and which is fitted in the outer divergent portion and connected thereto by connecting means associated with means for selectively destroying said connecting means to allow separation and ejection of the inner divergent portion at a predetermined instant of the functioning of the combustion chamber corresponding to a predetermined altitude of the rocket propulsion system, the inner divergent portion is retained in position inside the outer divergent portion by said connecting means which themselves are fixed to the lower part of the inner divergent portion, on the one hand, and to the lower part of the outer divergent portion on the other hand, whilst the upper part of the inner divergent portion is fitted laterally against the upper part of the outer divergent portion, at the exit of the nozzle throat, and pressure balancing ports are arranged in the inner divergent portion.

2. The combustion chamber as defined in claim 1, wherein the space between the inner divergent portion and the outer divergent portion is obturated by a ring connected to the lower part of the inner divergent portion.

3. The combustion chamber as defined in claim 1, wherein the means for selectively destroying the connecting means connecting the inner divergent portion to the outer divergent portion are constituted by simple pyrotechnic charges acting on the base of the outer divergent portion.

4. The combustion chamber as defined in claim 1, wherein the pressure balancing ports are placed so as to create a pressure of about 3 bars in the space between the inner divergent portion and the outer divergent portion.

5. The combustion chamber as defined in claim 1, wherein deflectors are mounted on the inner divergent portion in the vicinity of the pressure balancing ports in order to limit the projections of jets of gas against the outer divergent portion.

6. The combustion chamber as defined in claim 2, wherein the space between the inner and outer divergent portions is filled with a cooling fluid.

7. The combustion chamber as defined in claim 6, wherein additional ports are made in the inner divergent portion in the lower part thereof and are extended by tubes which are disposed in the space between divergent portions and emerge at the upper part of said space between divergent portions, above the cooling fluid.

8. The combustion chamber as defined in claim 1, wherein binding washers are associated with the inner divergent portion.

9. The combustion chamber as defined in claim 1, wherein it comprises means for cooling the walls of the combustion chamber which are constituted by a liquid film circulating downwardly along the inner walls of the chamber.

10. The combustion chamber of claim 1, wherein, in the zone of connection of the inner divergent portion and the outer divergent portion at the exit of the nozzle throat, the outer divergent portion presents in its upper part supporting the nozzle throat a shoulder forming an abrupt, limited shoulder of the section of the outer divergent portion and the upper end of the inner divergent portion forming leading edge is fitted beneath said shoulder.

11. The combustion chamber as defined in claim 1, wherein, in the zone of connection of the inner divergent portion and the outer divergent portion at the exit of the nozzle throat, the outer divergent portion presents no discontinuity, whilst the upper end of the inner divergent portion forming leading edge abuts against the wall of the outer divergent portion, forming an abrupt, limited narrowing of the section of the divergent portion constituted by the upper part of the outer divergent portion forming support of the nozzle throat and the inner divergent portion.

12. The combustion chamber as defined in claim 1, wherein the inner divergent portion is made of a non-metallic composite material.

13. The combustion chamber as defined in claim 12, wherein the inner divergent portion comprises in its upper part forming leading edge an insert made of refractory metallic material.

14. The combustion chamber as defined in claim 1, wherein the inner divergent portion is made entirely of a refractory metallic material.

* * * * *

UNITED STATES PATENT AND TRADEMARK OFFICE
CERTIFICATE OF CORRECTION

PATENT NO. : 4,434,614

DATED : March 6, 1984

INVENTOR(S) : George Gill

It is certified that error appears in the above-identified patent and that said Letters Patent is hereby corrected as shown below:

On the title page insert:

-- /73/ Assignee: Societe Anonyme dite: Societe Europeenne de Propulsion, Puteaux, France --.

Signed and Sealed this

Twelfth Day of February 1985

[SEAL]

Attest:

DONALD J. QUIGG

Attesting Officer     Acting Commissioner of Patents and Trademarks